Oct. 7, 1952  E. D. SCOTT  2,612,665
COMBINED WEATHERSTRIP AND RETAINER
Filed Sept. 19, 1947  2 SHEETS—SHEET 1
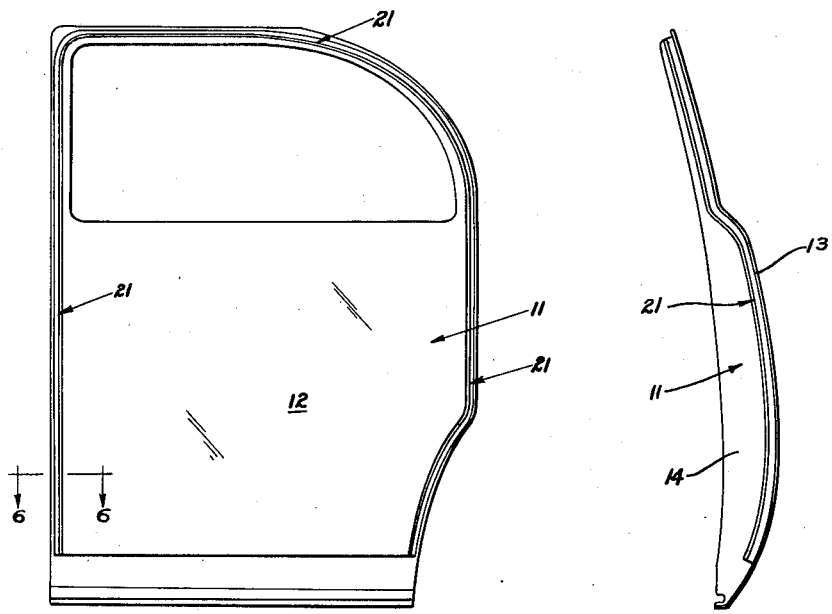
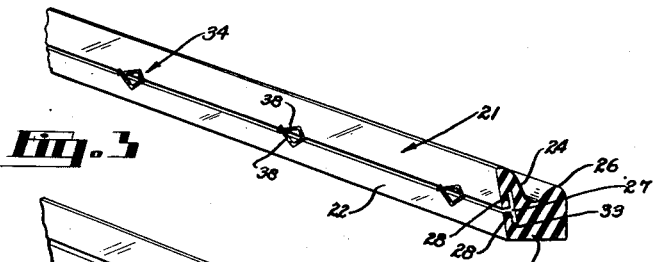
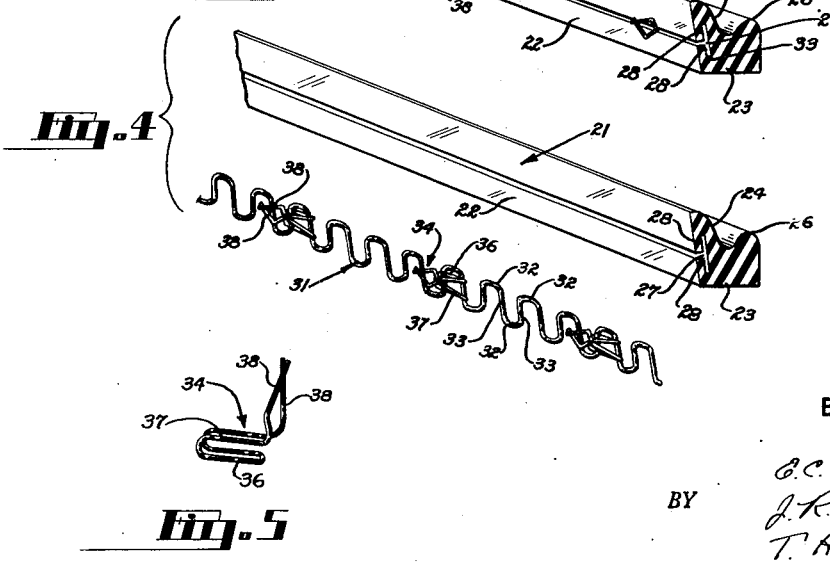
E. D. SCOTT
INVENTOR.
BY
ATTORNEYS Oct. 7, 1952     E. D. SCOTT     2,612,665
COMBINED WEATHERSTRIP AND RETAINER Filed Sept. 19, 1947     2 SHEETS—SHEET 2

E. D. SCOTT
*INVENTOR.*

BY E.C. McRae
J. R. Faulkner
T. H. Oster

ATTORNEYS.

Patented Oct. 7, 1952

2,612,665

UNITED STATES PATENT OFFICE 2,612,665

COMBINED WEATHER STRIP AND RETAINER

Edwin D. Scott, Plymouth, Mich., assignor to Ford Motor Company, Dearborn, Mich., a corporation of Delaware Application September 19, 1947, Serial No. 775,127

2 Claims. (Cl. 20—69)

This invention relates generally to a combined weatherstrip and retainer, and has particular reference to a resilient and flexible weatherstrip construction adapted to provide a weathertight seal for a closure.

In the automotive field, rubber weatherstrips have been used to effect weathertight seals between the doors of the vehicle and the body, and also between the rear deck and the body. Conventionally, the weatherstrip is of such shape as to be partially compressed when the door of rear deck is closed, and is secured to the edge of the door or rear deck by means of cement or other adhesive material. Considerable difficulty has been encountered in mounting the weatherstrip in a manner which will be permanent and will not loosen or become disengaged after a period of use. In addition, the trend of modern styling results in body and door contours requiring a weatherstrip which may be flexed both longitudinally and transversely of the car body, and in some instances torsionally twisted. Under such extreme conditions, it is even more difficult to provide a weatherstrip which will properly and permanently adhere to the adjacent structure. Although auxiliary fastening elements have sometimes been used to prevent certain portions of the weatherstripping from becoming disengaged, these are not entirely satisfactory since they are only locally effective in holding the weatherstrip, and since they are rather time-consuming and expensive to apply.

Accordingly, the present invention has for one of its principal objects the elimination of the above-mentioned difficulties by the provision of a combined weatherstrip and retainer which may be quickly and permanently secured to an adjacent surface regardless of the contour of the latter. In an embodiment of the invention this is accomplished by providing a continuous corrugated wire element of sinuous shape supporting a resilient sealing strip, the sinuous wire element carrying a plurality of longitudinally spaced fastening elements to secure the weatherstrip assembly to the door or other support. The wire element not only provides a mounting for the fastening elements, but also forms an adequate support for the rubber sealing strip so that the latter is maintained in close engagement with the door at all points, between the fastening elements as well as adjacent thereto. In addition, the wire element is flexible not only in a plane normal to the plane of the element but also is extremely flexible in a transverse direction in the plane of the wire. It can also be twisted and thus can be bent to any desired shape to follow the contour of the door or the body. Furthermore, it is longitudinally extensible so that it may be stretched or compressed if necessary to secure proper registration between the fastening elements and the co-operating holes in the door or body panel. With this construction the weatherstrip and retainer may be twisted through an angle of 90 degrees or more if necessary to rotate the working surface of the weatherstrip to provide the proper sealing engagement at various portions of the door.

A further object of the present invention is to provide a weatherstrip comprising a resilient sealing strip so formed as to receive and enclose a continuous flexible metal element supporting a plurality of spaced fastening elements. In an embodiment of the invention, the rubber sealing strip is formed with a T-shaped groove which may be spread apart to receive the corrugated metal element with the fastening elements protruding therefrom.

Still another object of the invention is to provide a weatherstrip in which a continuous corrugated wire element supporting a plurality of spaced fastening elements is embedded or moulded within a rubber sealing strip with the fastening elements projecting therefrom, the resulting unit being distortionable in all directions as well as longitudinally extensible.

Other objects and advantages of the invention will be made more apparent as this description proceeds, particularly when considered in connection with the accompanying drawings, in which:

Figure 1 is an inside elevation of the rear door of a four-door automobile body upon which is mounted a weatherstrip incorporating the present invention.

Figure 2 is an end elevation of the rearward edge of the door shown in Figure 1.

Figure 3 is a perspective view of a portion of a weatherstrip constructed in accordance with the present invention.

Figure 4 is an exploded view of the weatherstrip shown in Figure 3 prior to the assembly of the wire element within the rubber sealing strip.

Figure 5 is a perspective view of one of the trim clips.

Figure 6:
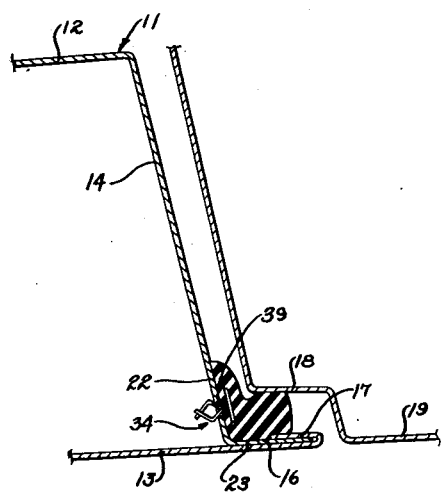
Figure 6 is a horizontal cross sectional view taken substantially on the plane indicated by the line 6—6 of Figure 1, and also showing the adjacent co-operating portion of the automobile body.
Figure 7:
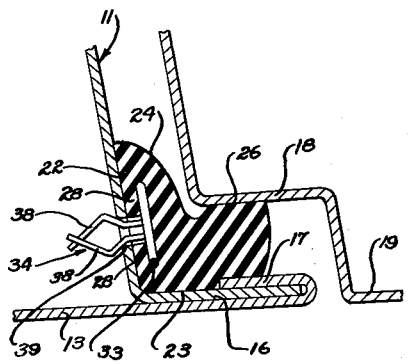
Figure 7 is a fragmentary cross sectional view, on an enlarged scale, of the structure shown in Figure 6.

Although the weatherstrip construction of the present invention has many various applications, for the purposes of illustration it is shown as being used with the rear door of an automobile body, it being particularly well adapted for automotive use since it results in a permanent installation regardless of weather conditions and since it may be bent, flexed, twisted, and/or stretched to the configuration required by the particular styling of the automobile body.

The door 11 is conventionally constructed of an inner sheet metal panel 12 and an outer sheet metal panel 13. The inner panel 12 is bent outwardly to form a jamb face 14 extending outwardly to the outer panel 13, and is then formed with a marginal flange 16 lying adjacent the outer panel 13 and suitably secured thereto, as by spot-welding. The marginal edge of the outer panel 13 is bent over the marginal flange 16 of the inner panel, as at 17, and the resulting assembly forms a lip or flange overlying the adjacent and inwardly offset portion 18 of the adjacent body panel 19.

In conventional construction a resilient rubber strip is cemented to this overlying lip or flange of the door and extends completely around the periphery of the latter. It will be seen from an examination of Figures 1 and 2 that a typical automobile door following modern styling trends is of a complexly contoured three-dimensional shape, and that a sealing strip carried thereby must be bent in such manner as to conform to the configuration of the door. This is possible with the weatherstrip of the present invention, yet the weatherstrip is permanently and securely fastened to the door in such manner that it will remain thereon throughout the life of the car.

Referring now to Figures 3 to 7 inclusive, which illustrate one embodiment of the invention, the reference character 21 indicates a resilient sealing strip preferably formed of rubber and in this instance having generally flat surfaces 22 and 23 adapted to be positioned in engagement with the jamb face 14 and the marginal flange 16 respectively of the door. These flat surfaces are joined by a curved surface 24 which in this instance is provided with a bulge 26 adapted to be engaged by the offset portion 18 of the adjacent body panel when the door is closed and slightly flattened to form a seal therebetween. The particular shape of the sealing strip may vary considerably, of course, with different installations.

A T-shaped groove 27 is formed in the sealing strip 21 and opens into the face 22 thereof. As will be seen from the drawing, the base portion of the T-shaped slot extends generally parallel to the face 22 of the sealing strip. The T-shaped groove results in the formation of a pair of thin flexible lips or flanges 28 spaced from each other. The rubber sealing strip thus described may be formed as desired, as for example by moulding or by extruding.

Corrugated wire 31 of sinuous shape is provided for insertion in the T-shaped slot 27 of the sealing strip, and is shown as comprising right- and left-handed loops 32 connected by straight wire portions rectangularly related to the longitudinal axis of the wire strip. The wire 31 is continuously corrugated from one end to the other, simplifying the construction and reducing the cost thereof since it may be made by a continuous process and cut to any desired length.

As best seen in Figure 4, trim clips 34 are attached to the corrugated wire 31 at longitudinally spaced points. The trim clips may be of any suitable type, a variety of spring wire and sheet metal trim clips now being in common use in automobile body work. The particular clip shown (Figure 5) is formed of a single piece of wire, bent to form a U-shaped base portion 36 and return bent portions 37 spaced from the base portion and extending generally parallel thereto. The return bent portions 37 are then angularly bent to form legs 38 having their extreme ends converging towards each other and arranged in overlapping fashion. The legs 38 together form a generally diamond-shaped attaching portion. The trim clips are conveniently attached to the corrugated wire 31 wherever desired simply by slipping them over any pair of adjacent corrugations of the wire. As best shown in Figure 4, in this assembled position the adjacent convolutions of the continuous corrugated wire 31 are embraced between the base portion 36 and the return bent portions 37 of the trim clips, the dimensions of the parts being such that the clip is resiliently held thereon. The corrugated wire with the trim clips mounted thereon is then assembled to the resilient sealing strip 21 by spreading apart the flexible lips 28 and inserting the corrugated wire within the base of the T-shaped slot 27. The clearance between the adjacent ends of the lips 28 of the sealing strip provides room for the trim clips 34 which extend therethrough and expose the legs 38 forming the diamond-shaped attaching portions.

The assembled weatherstrip is easily attached to the door, as shown in Figure 6, by positioning it adjacent the marginal flange 16 of the door and snapping the legs 38 of the trim clips 34 through spaced holes 39 formed in the jamb face 14 of the door. It will be seen that the lips or flanges 28 of the sealing strip are firmly held between the corrugated wire 31 and the jamb face 14 of the door, the diamond-shaped attaching portion of the trim clip being such as to tend to maintain the sealing strip in tight sealing engagement with the door.

It will be apparent that the weatherstrip is permanently and securely attached to the door and cannot become disengaged therefrom. The spacing of the trim clips upon the corrugated wire is selected so as to maintain continuous engagement between the sealing strip and the door throughout the length of the sealing strip, the sealing characteristics of the sealing strip intermediate the trim clips being enhanced by the continuous corrugated wire within the sealing strip. In addition to thus forming a weatherstrip which may be permanently and easily attached to an adjacent structure, the construction is such that the weatherstrip may be distorted or bent in any manner as desired to conform to the configuration of the door or other structure to which it is to be attached. The corrugated continuous wire 31 may of course be readily bent in a direction normal to the plane of the wire, and likewise is equally flexible in a transverse direction in the plane of the wire. Thus it may be bent or twisted or distorted in any manner necessary to cause the weatherstrip to conform to the configuration of the door. In addition, the corrugated wire is longitudinally extensible and the weatherstrip unit may thus be stretched or compressed where necessary to effect a proper fit and also when necessary to cause the proper registration between the trim clips 34 and the holes 39 provided in the door.

Figure 8:
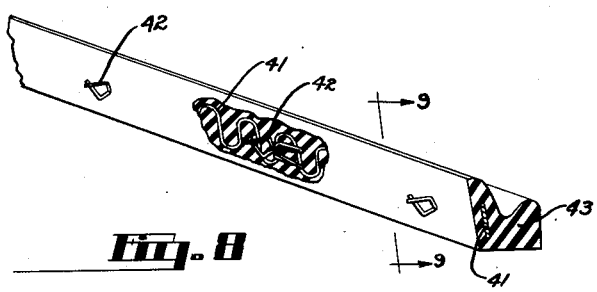
Figure 8 is a perspective view, partially broken away, similar to Figure 3 but showing a modification of the invention.
Figure 9:
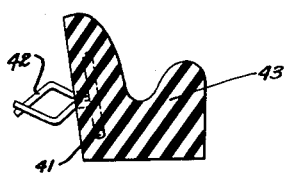
Figure 9 is an enlarged cross sectional view taken substantially on the plane indicated by the line 9—9 of Figure 8.

A modification of the invention is shown in Figures 8 and 9, in which a corrugated continuous wire 41 carrying spaced trim clips 42, similar to that shown in connection with the modification of Figures 3 to 7 inclusive, is embedded or moulded within a rubber sealing strip 43. With this arrangement the corrugated wire is completely enclosed with a layer of rubber being provided on each side thereof, and the trim clips extend or project through the surface of the sealing strip so that they may be readily inserted into holes in the structure to which the weatherstrip is to be attached. As with the other illustrated form of the invention, a layer of rubber is maintained between the corrugated wire and the adjacent metal surface so as to eliminate as much as possible all metal-to-metal contact. As with the other forms illustrated, the weatherstrip is flexible in all directions as well as longitudinally extensible.

As previously mentioned, various other types of trim clips may be used to advantage and these may be either frictionally held upon the corrugated wire or may be spot-welded thereto or otherwise held in the proper relative position prior to the assembly of the weatherstrip with the adjacent structure. After such assembly, the sealing strip, corrugated wire, and trim clips form an integral resiliently held assembly which cannot become detached.

Although I have shown and described certain embodiments of the invention, it will be understood that I do not wish to be limited to the exact construction shown and described, but that various changes and modifications may be made without departing from the spirit and scope of my invention, as defined in the appended claims.

What is claimed is:

1. A weatherstrip assembly comprising, in combination, an elongated rubber sealing strip having a flat face, said sealing strip having an elongated opening formed therein generally parallel to but spaced from its aforesaid flat face, an elongated corrugated wire element received within said opening, said corrugations comprising right- and left-handed loops connected by straight wire portions rectangularly related to the longitudinal axis of the element, and a plurality of fastening elements carried by said wire element at longitudinally spaced points, each of said fastening elements having a generally U-shaped base portion arranged to be slipped over adjacent loops and straight portions of said wire element and resiliently held thereon and each also having a yieldable attaching portion projecting from said base portion substantially at right angles thereto and extending outwardly from the flat face of said sealing strip.

2. A weatherstrip unit comprising, in combination, an elongated rubber sealing strip having a flat face with a T-shaped slot formed therein with the base of said T slot extending generally parallel to and spaced from the flat face of said sealing strip and with the leg of said T slot opening into the flat face of said sealing strip, an elongated wire element of sinuous shape received within the base of said slot and lying in a plane parallel to the flat face of said sealing strip, and a plurality of fastening elements carried by said wire element and having attaching portions projecting through the leg of said slot and extending outwardly from the flat face of said sealing strip.

EDWIN D. SCOTT.

REFERENCES CITED

The following references are of record in the file of this patent:

UNITED STATES PATENTS

| Number | Name | Date |
| --- | --- | --- |
| 2,070,839 | Place | Feb. 16, 1937 |
| 2,139,780 | Tea | Dec. 13, 1938 |
| 2,161,648 | Widman | June 6, 1939 |
| 2,169,503 | Schlegel | Aug. 15, 1939 |
| 2,211,257 | Deisley et al. | Aug. 13, 1940 |
| 2,219,382 | Conlon | Oct. 29, 1940 |
| 2,254,311 | Place | Sept. 2, 1941 |
| 2,287,606 | Eady | June 23, 1942 |
| 2,347,159 | Spraragen | Apr. 18, 1944 |

FOREIGN PATENTS

| Number | Country | Date |
| --- | --- | --- |
| 102,938 | Australia | 1938 |